United States Patent

[11] 3,618,633

| [72] | Inventors | Paul K. Bizilia;<br>Albert G. Wordsworth, both of Sayre, Pa. |
|---|---|---|
| [21] | Appl. No. | 2,098 |
| [22] | Filed | Jan. 12, 1970 |
| [45] | Patented | Nov. 9, 1971 |
| [73] | Assignee | Ingersoll-RAnd Company<br>New York, N.Y. |

[54] REVERSE VALVE FOR PNEUMATIC TOOL
4 Claims, 6 Drawing Figs.

[52] U.S. Cl. ................................................ 137/560, 137/625.17
[51] Int. Cl. ................................................ F16k 11/00
[50] Field of Search .................................. 137/625.17, 636.4, 625.68, 560

[56] References Cited
UNITED STATES PATENTS
| 3,123,100 | 3/1964 | Burnett | 137/625.17 |
| 3,269,412 | 8/1966 | Badke | 137/625.17 |
| 3,280,842 | 10/1966 | Weisenbach | 137/625.17 |
| 3,319,725 | 5/1967 | Edwards | 137/625.17 X |

Primary Examiner—William R. Cline
Attorneys—Carl R. Horten and David W. Tibbott

ABSTRACT: A reverse valve for an air-powered wrench including a spool valve mounted in a valve bore to reciprocate axially between alternate positions controlling the rotary direction of the wrench. The valve also rotates to progressively control the flow of fluid through the valve while providing an unrestricted flow of fluid through the valve when seifted from one axial position, wherein the flow is restricted, to the alternate axial position without changing its rotary position in the bore.

PATENTED NOV 9 1971 3,618,633
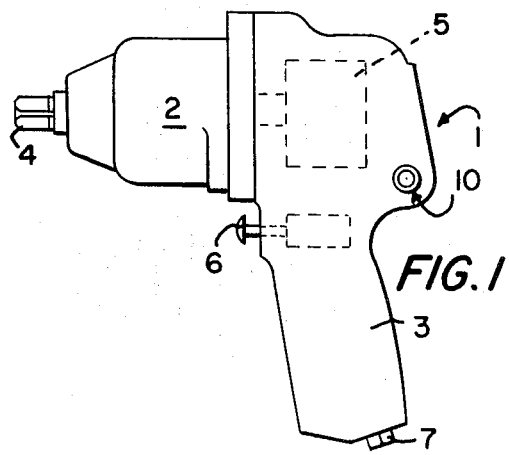
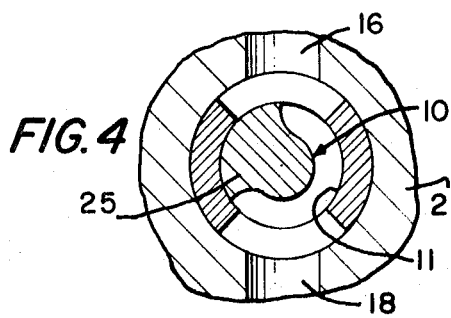
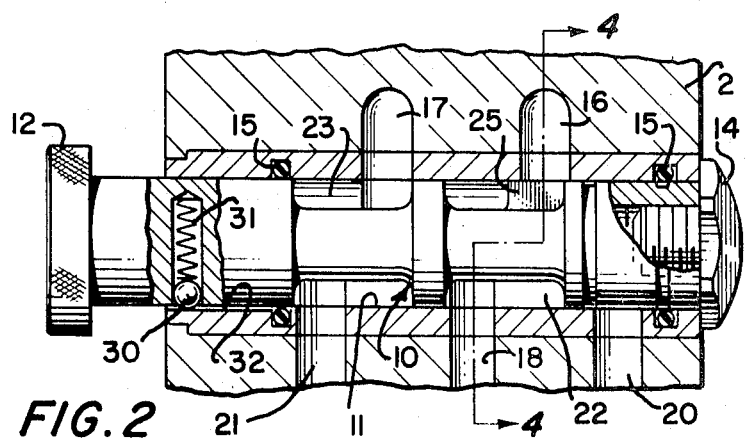
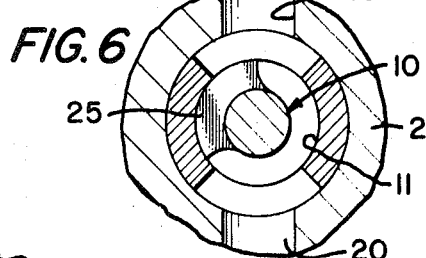
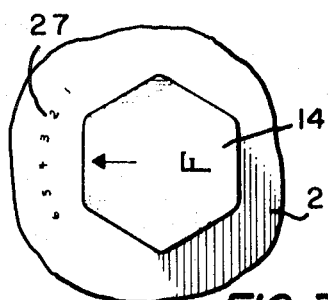
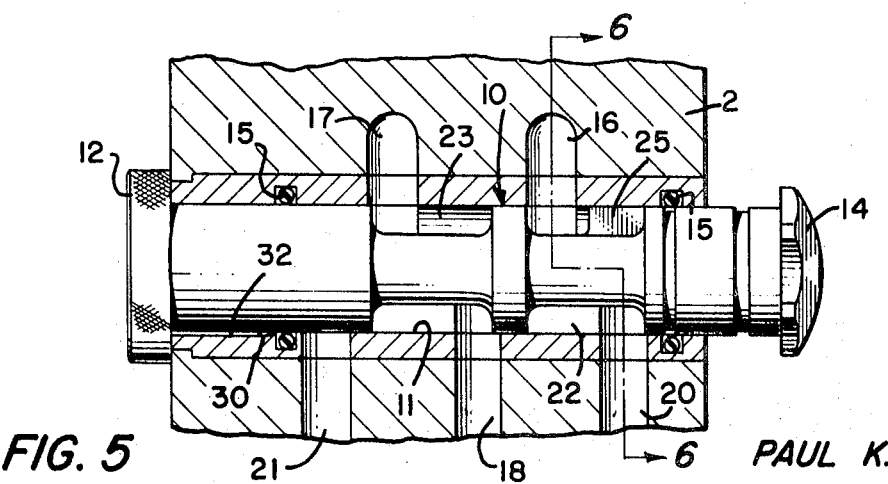
INVENTORS
PAUL K. BIZILIA
ALBERT G. WORDSWORTH
BY
David W. Tibbons
ATTORNEY

REVERSE VALVE FOR PNEUMATIC TOOL

BACKGROUND OF THE INVENTION

This invention relates to fluid-powered wrenches of the reversible type and more particularly to a reverse valve system for such wrenches.

A prior art reverse valve for air-powered impact wrenches includes a spool valve which is movable axially in a bore between alternate positions for reversing the rotation of a wrench. This valve can also be progressively rotated to vary the flow of airpower to the wrench, thereby controlling the power of the wrench. However, after the valve is adjusted in a rotary direction to provide a selected amount of restricted airpower to the wrench, the shifting of the valve axially to a reverse position will also provide the same restriction to the airflow. In general, while it is often desirable to limit the power of a wrench tightening a fastener, full power is desired to remove a fastener. Hence, in using the foregoing prior art valve system, to obtain full power when reversing the wrench, the operator must disturb the restricted flow adjustment of the wrench so that such adjustment must again be performed when the wrench is returned to its forward rotary drive position.

SUMMARY OF INVENTION

The principal object of this invention is to provide a reverse valve system of the axial shifting type with a rotary flow control which automatically provides for the flow of full power to the wrench when the valve is shifted to a reverse position.

Other important objects of the invention are: to provide an axially shifting reverse valve and combination rotary-adjustment flow control valve which can be adjusted to control flow in only a single rotary direction of the wrench and which retains its adjusted position while being reversed and returned to the forward driving direction of the wrench and to provide a reverse valve of the foregoing type which can also be adjusted to control flow in either rotary direction of the wrench.

In general, the foregoing objects are attained in a structure including a spool valve reciprocating and rotating in a valve bore containing motor ports and air supply and exhaust ports. The valve moves longitudinally between alternate positions to interconnect the ports in an alternate manner to cause the motor to rotate in alternate directions. The valve is provided with a plug located to progressively restrict a motor port in one longitudinal position of the valve while uncovering the motor port when moved longitudinally to its alternate position, without rotating the valve.

BRIEF DESCRIPTION OF DRAWING

The invention is described in connection with the accompanying drawing wherein:

FIG. 1 is an elevational view of an air-powered impact wrench containing the novel reverse valve system of this invention;

FIG. 2 is an axial section of the reverse valve on an enlarged scale with the valve in a flow-controlled position;

FIG. 3 is an end view of the valve in FIG. 2;

FIG. 4 is a section taken on the line 4—4 in FIG. 2;

FIG. 5 is an axial section similar to FIG. 2 with the valve shifted to a reverse position and in a nonrestricted full-power position; and FIG. 6 is a section taken on the line 6—6 in FIG. 5.

DESCRIPTION OF PREFERRED EMBODIMENT

A conventional impact wrench 1 is shown in FIG. 1 and includes a casing 2, a handle 3, a spindle 4, a motor 5 (shown in dotted lines), a trigger 6, and a fitting 7 adapted to be connected to a compressed airhose (not shown). A reverse valve 10 is mounted near the rear end of the casing 2 for shifting to alternate positions to change the direction of rotation of the motor 5.

This invention involves an improved reverse valve 10. The reverse valve 10 is a spool-type valve and slides axially in a bore 11 formed in the wrench 1. The spool valve 10 includes an enlarged knurled knob 12 at one end and a headed screw 14 threaded into its other end. The knob 12 and screw 14 limit the axial travel of the valve 10 in the bore 11. O-rings 15 are mounted in the opposite ends of the bore 11 around the valve 10 for sealing purposes.

Looking at FIG. 2, a pair of motor passages connect respectively to ports 16 and 17 opening into the bore 11. The ports are termed the forward port 16 and a reverse port 17. A compressed air supply inlet passage 18 opens into the bore 11 and a pair of exhaust passages 20 and 21 also open into the bore 11. The spool valve 10 includes a pair of spaced annular grooves which are termed annular chambers 22 and 23. As the spool valve 10 is shifted to alternate positions, one chamber connects the inlet passage 18 to one of the motor ports (port 16 in FIG. 2) and the other chamber connects the other port (port 17 in FIG. 2) with an exhaust passage.

Looking at FIG. 4, the chamber 22 includes a fan shaped plug 25 fixed on the valve 10 and located to cover an arcuate portion of the chamber 22 and extend over about one-half of its length. The plug 25 is placed so as to progressively cover and restrict the motor port 16 as the spool valve 10 is rotated. As the valve is rotated to restrict the motor port 16, it serves to progressively restrict the air flowing to the motor. Thus, valve 10 is not only a reverse valve, it is also a flow-control valve.

Looking at FIG. 3, the head of the screw 14 carries an arrow and a series of calibrations 27 are marked on the casing 2 adjacent the screw to aid the operator in rotating the valve 10 to adjust the airflow.

Looking at FIG. 5, when the spool valve 10 is shifted axially to the reverse position, the plug 25 no longer restricts the motor port 16. This result is due to the fact that the plug 25 extends longitudinally over only one-half the length of the annular chamber 22. As a result, the motor receives a full flow of compressed air. Hence, the operator can obtain a full flow of power to the wrench motor in the reverse position without disturbing the rotary adjustment of the valve. When the operator shifts the valve 10 back to the forward position shown in FIG. 2, the valve will be in its former flow-adjusted position.

The valve 10 carries a detent ball 30 located near the knob 12 in a radial hole containing a spring 31 urging the detent ball 30 outward. The bore 11 carries several longitudinally extending grooves 32 to receive the detent ball 30 to cooperate in holding the valve 10 in an adjusted position. The detent grooves 32 are placed at intervals to correspond to the calibrations 27.

The valve 10 can also be adjusted to restrict the airflow in the reverse position of the valve. However, in this position it will restrict the exhaust flow from the wrench motor 5, which will provide the same result as restricting the inlet flow to the wrench motor 5. In other words, restriction of either the inlet or exhaust of the wrench motor 5 will have the same result of restricting the power of the wrench motor 5.

When the valve 10 is moved longitudinally to its reverse position, as shown in FIG. 5, the power can be restricted by rotating the valve about 180° to a position where the fan-shaped plug 25 will restrict the exhaust passage 20. In this position, the valve 10 can be rotated progressively to vary the restriction of the exhaust passage 20 in the same manner that was done with the valve 10 in its forward position.

Although only a single embodiment of the invention is described in detail, it will be understood that the invention is not limited merely to these embodiments, but contemplates other embodiments and variations which utilize the concepts and teachings of this invention.

We claim:

1. A fluid-operated rotary power tool including a casing containing a rotary motor and a reverse valve system comprising:

a cylindrical valve bore in said casing;

a spool valve mounted in said valve bore for reciprocating and rotary movements and having a partition dividing said bore into a pair of separate chambers which are longitudinally spaced along said bore;

first and second motor ports in said valve bore and opening into separate chambers of said pair of chambers;

a fluid inlet and a pair of exhaust passages opening into said valve bore, said inlet being located between said exhaust passages;

said spool valve being longitudinally movable in said bore between alternate forward and reverse positions located at the opposite ends of its longitudinal travel in said bore and being arranged to interconnect said inlet to alternate chambers in said alternate positions with the chamber that is not connected to said inlet being connected to one of said exhaust passages wherein said motor is driven in alternate directions in said alternate positions of said valves;

means on said valve in one of said chambers for progressively restricting the flow of fluid through the motor port opening in the said one chamber when said valve is in said forward position and is rotated in a given rotary direction over less than one revolution; and said means being located on said valve to move away from the motor port in said one chamber when said valve is moved longitudinally from said forward position, providing a restricted flow of fluid, to said reverse position without changing its rotary position in said bore, thereby eliminating the restriction of the motor port to allow an unrestricted flow of fluid through the motor port in said one chamber.

2. The reverse valve system of claim 1 including:

means for retaining said valve in a plurality of selected rotary positions in said bore.

3. The reverse valve system of claim 1 wherein:

said means will restrict the flow of fluid through said valve in the reverse position of said valve when said valve is rotated to another rotary position in said bore.

4. The reverse valve system of claim 3 wherein:

said means is arranged to allow an unrestricted flow of fluid through said valve in the forward position of said valve when said valve is in said another rotary position in said bore.

* * * * *